(12) United States Patent
Kosidlo et al.

(10) Patent No.: US 7,496,993 B2
(45) Date of Patent: Mar. 3, 2009

(54) RETENTION CLIP

(75) Inventors: John M. Kosidlo, White Lake, MI (US);
James B. Carrier, Rochester, MI (US);
Kent S. Gimmy, Gallatin, TN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/865,142

(22) Filed: Oct. 1, 2007

(65) Prior Publication Data

US 2008/0134472 A1 Jun. 12, 2008

Related U.S. Application Data

(60) Provisional application No. 60/873,862, filed on Dec. 8, 2006.

(51) Int. Cl.
*F16B 5/06* (2006.01)

(52) U.S. Cl. .......................... 24/295; 411/508

(58) Field of Classification Search ................ None
See application file for complete search history.

(56) References Cited

U.S. PATENT DOCUMENTS

| | | | | |
|---|---|---|---|---|
| 2,560,530 A | * | 7/1951 | Burdick | ....................... 411/508 |
| 3,092,175 A | * | 6/1963 | Suessle | ....................... 160/390 |
| 4,610,588 A | | 9/1986 | Van Buren, Jr. et al. | |
| 5,645,384 A | | 7/1997 | Wright et al. | |
| 5,706,559 A | * | 1/1998 | Oliver et al. | ................... 267/49 |
| 5,919,019 A | | 7/1999 | Fischer | |
| 6,095,734 A | | 8/2000 | Postadan et al. | |
| 6,438,804 B1 | * | 8/2002 | Romero Magarino | ........ 24/289 |
| 2003/0071475 A1 | | 4/2003 | Abejon et al. | |

FOREIGN PATENT DOCUMENTS

| | | |
|---|---|---|
| DE | 3212160 A1 | 10/1983 |
| FR | 2572144 A | 4/1986 |
| GB | 634 157 A | 3/1950 |
| GB | 635670 A | 4/1950 |

* cited by examiner

*Primary Examiner*—Jack W. Lavinder
(74) *Attorney, Agent, or Firm*—Mark W. Croll; Paul F. Donovan

(57) ABSTRACT

A retention clip includes a generally cylindrical main portion having a leading end configured to pass into a hole of a panel, at least one retaining tab extending from the main portion, and at least one spring member extending from the main portion. The at least one retaining tab and the at least one spring member are configured to compressively sandwich a portion of the panel therebetween.

16 Claims, 5 Drawing Sheets

RETENTION CLIP

RELATED APPLICATIONS

This application relates to and claims priority benefits from U.S. Provisional Patent Application No. 60/873,862 entitled "Retention Clip," filed Dec. 8, 2006, which is hereby incorporated by reference in its entirety.

FIELD OF THE INVENTION

Embodiments of the present invention generally relate to a retention clip, and more particularly to a retention clip having lateral spring-biased flaps or wings.

BACKGROUND OF THE INVENTION

Fastening clips are used in various applications. For example, fastening clips may be secured to a piece of sheet metal within an automobile. Another component, such as an airbag system, may then be secured to the sheet metal by way of the fastening clips.

Typically, a tool is used to install the fastening clips to a piece of sheet metal. Indeed, various clips are secured to the piece of sheet metal through separate fasteners, such as screws or bolts, that threadably pass through portions of the clips. Further, the shape of many clips does not coincide with a hole into which the clip is to be positioned. For example, the axial cross-sectional shape of a clip may be square, while the hole is round. As such, positioning a particular clip into a hole may not be easy.

In general, a relatively large deflection force is used to move the outer edges of a conventional clip into a round hole formed in a panel (such as a piece of sheet metal). Thus, a high insertion force is used to install the clip into the hole formed through the panel. Due to the high insertion force, a tool, such as pliers, is typically used to compress the clip so that it fits into the hole. The use of a separate tool typically adds time, cost and effort to the manufacturing process.

SUMMARY OF THE INVENTION

Embodiments of the present invention provide a retention clip that may include a generally cylindrical main portion having a leading end(s) configured to pass into a hole of a panel, at least one retaining tab extending from the main portion, and at least one spring member extending from the main portion. The retaining tab(s) and the spring member(s) are configured to compressively sandwich a portion of the panel therebetween. The retaining tab(s) are configured to snapably secure to the portion of the panel. The audible click or snap emitted by the snapable engagement indicates that the retention clip is fully secured to the panel. The leading end(s) may be radially canted toward a center of the main portion.

The main portion may be a cylindrical or semi-cylindrical main body, or a series of semi-cylindrical wall portions that collectively form a portion of a cylindrical structure. An opening may be formed in the main portion. The opening may be configured to allow the main portion to inwardly flex when the retention clip is inserted into, and removed from, the hole of the panel.

The retaining tab(s) may be semi-cylindrical tapered louvers. Each louver may taper down toward the leading end of the main portion.

The retention clip may also include at least one extending beam connected to the main portion. At least one of the retaining tabs may extend from a lower area of the extending beam. The extending beam extends above the retaining tabs and may be manipulated by an operator to disengage at least one of the retaining tabs from a fully secured (e.g., latched) position.

Optionally, the retaining tabs may be a plurality of planar, flat tabs evenly spaced about the main portion. The flat, board-like planar tabs allow for a lower insertion force as compared to the more robust louvered tabs.

The at least one spring member may include two opposed spring members. For example, the two spring members may be spaced 180° apart from one another about an upper area of the main portion. Each spring member may include a beam extending from the main portion and a wing connected to the beam, wherein a portion of the wing is configured to abut the portion of the panel.

Figure 1:
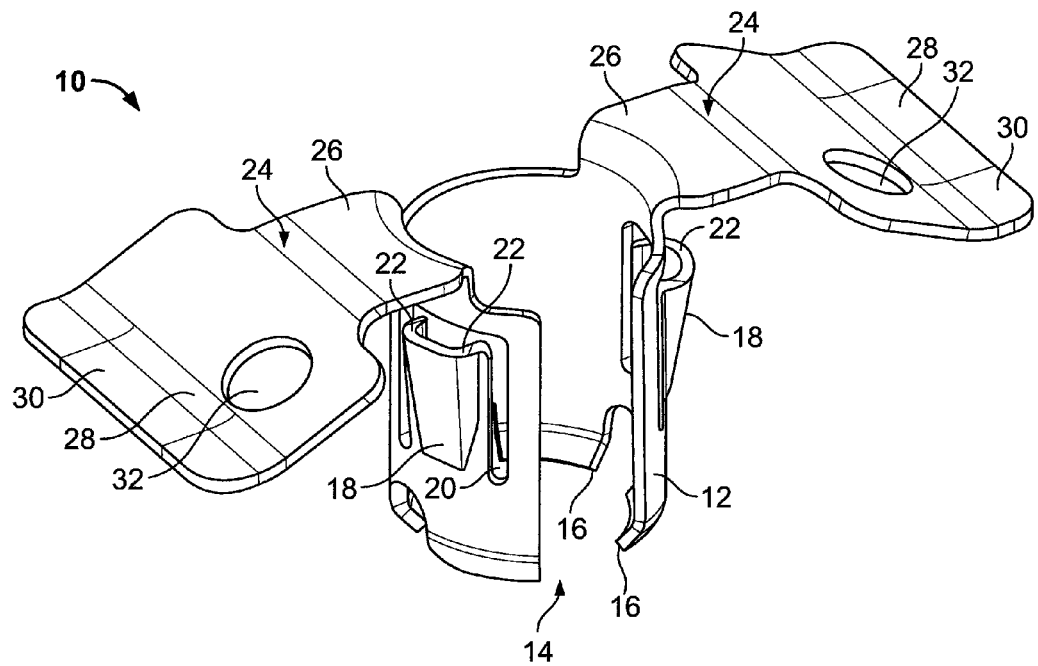
FIG. 1 illustrates an isometric view of a retention clip according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 1 illustrates an isometric view of a retention clip 10 according to an embodiment of the present invention. The retention clip 10 includes a generally cylindrical main portion, such as a main body or walls 12 having an opening 14 formed therein or therebetween. The shape of the main body 12 corresponds to the shape of a circular opening formed in a panel. Thus, the main body 12 is configured to easily pass into the opening. During insertion into a hole, the main body 12 may inwardly flex by way of the opening 14. That is, as the main body 12 passes into a hole, the edges defining the hole may squeeze the main body 12 through the space defined by the opening 14. In general, the opening 14 permits the retention clip 10 to inwardly deflect to facilitate insertion into, and removal from, a hole formed in a panel.

Lower or leading ends 16 of the main body 12 are inwardly canted, curved or the like. For example, the leading ends 16 may be radially canted, bent or curved toward a center of the main body 12. As such, the lower ends 16 provide a lead-in feature that allows the retention clip 10 to be easily positioned within a hole formed through a panel. That is, a circumferential envelope of the lower ends 16 may be smaller than a circumference of the hole, thereby allowing the lower ends 16 to easily fit within the hole.

Louvered retaining tabs 18 are formed on the main body 12. As shown in FIG. 1, the retention clip 10 may include two retaining tabs 18, although more or less than those shown may be used. The louvered retaining tabs 18 are outwardly angled from the bottom to the top of the main body 12. Relief slots 20 are formed on both sides of the louvered retaining tabs 18 in order to provide greater flexibility. That is, the relief slots 20 allow the louvered retaining tabs 18 to easily flex.

As shown in FIG. 1, the louvered retaining tabs 18 include curved surfaces 22. The curved surfaces 22 are robust and configured to securely abut into an underside of a panel. The curved surfaces 22 act to spread forces out evenly over the louvered retaining tabs 18 and provide more strength than a flat tab.

The shapes of the curved surfaces 22 of the louvered retaining tabs 18 follow the cylindrical profile of the main body 12. The curved shapes of the louvered retaining tabs 18 resist bending and warping, thereby improving extraction performance. Depending on the size and shape of a hole into which the retaining clip 10 is to be positioned, the curvature of the louvered retaining tabs 18 may vary.

The retention clip 10 also includes lateral springs 24 that outwardly extend from upper edges of the main body 12. As shown in FIG. 1, two springs 24 are positioned 180° apart from one another. Each spring 24 includes a beam 26 that extends from the main body 12. The beams 26 are, in turn, connected to downwardly-canted wings 28. The beams 26 extend approximately level from the main body 12, while the wings 28 downwardly can't with respect to the plane of the beams 24. Distal ends 30 of the wings 28 may upwardly bend. For example, in an at-rest position, the planes of the distal ends 30 may be parallel with the planes of the beams 26.

As shown in FIG. 1, holes 32 are formed through the wings 28. The holes 28 may be configured to be engaged by an operative end of a tool, such as needle-nose pliers, in order to facilitate servicing and maintenance. For example, ends of pliers may be positioned within the holes 32 and the pliers may be used to pry up the wings 28.

Additionally, it has been found that the sizes of the holes 32 directly relate to the flexibility of the wings 32. If no holes are formed through the wings 28, then the wings 28 are relatively rigid. Larger holes 32 or openings formed through the wings decrease the rigidity and increase the flexibility of the wings 28.

Figure 2:
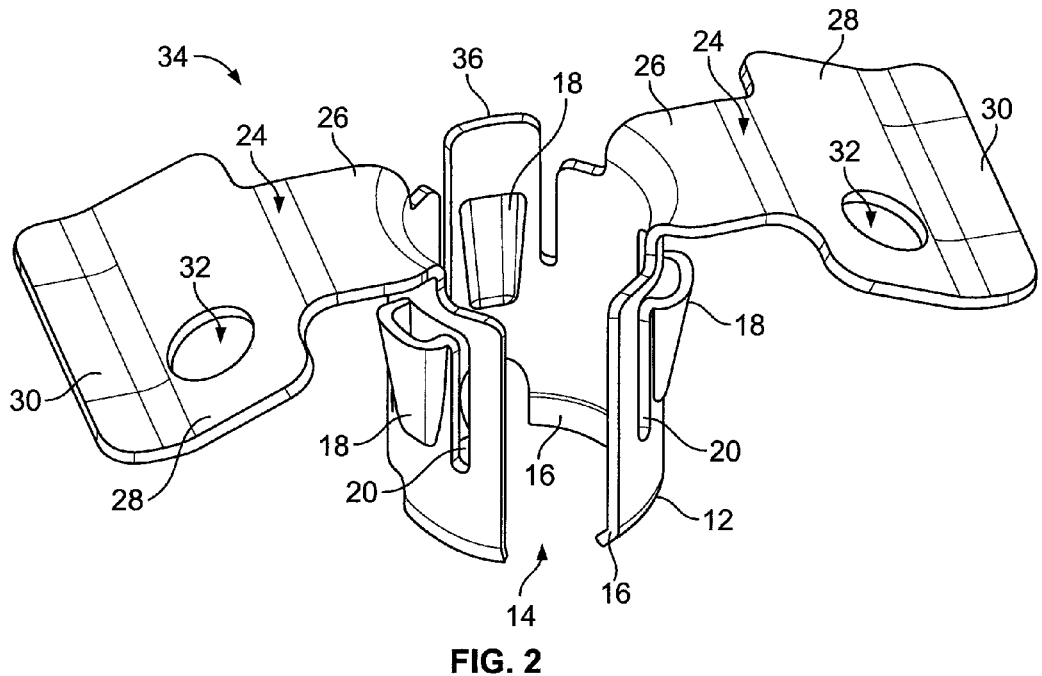
FIG. 2 illustrates an isometric view of a retention clip according to an embodiment of the present invention.

FIG. 2 illustrates an isometric view of a retention clip 34 according to an embodiment of the present invention. The retention clip 34 is similar to the retention clip 10, except that the retention clip 34 includes an extending beam 36 having a louvered retaining tab 18. The beam 36 extends above the top edges of the louvered retaining tabs 18 and is engageable above a surface of a panel in order to allow a user to service the retaining clip 34. As shown in FIG. 2, the louvered retaining tab 18 is located on a lower portion of the beam 36.

Figure 3:
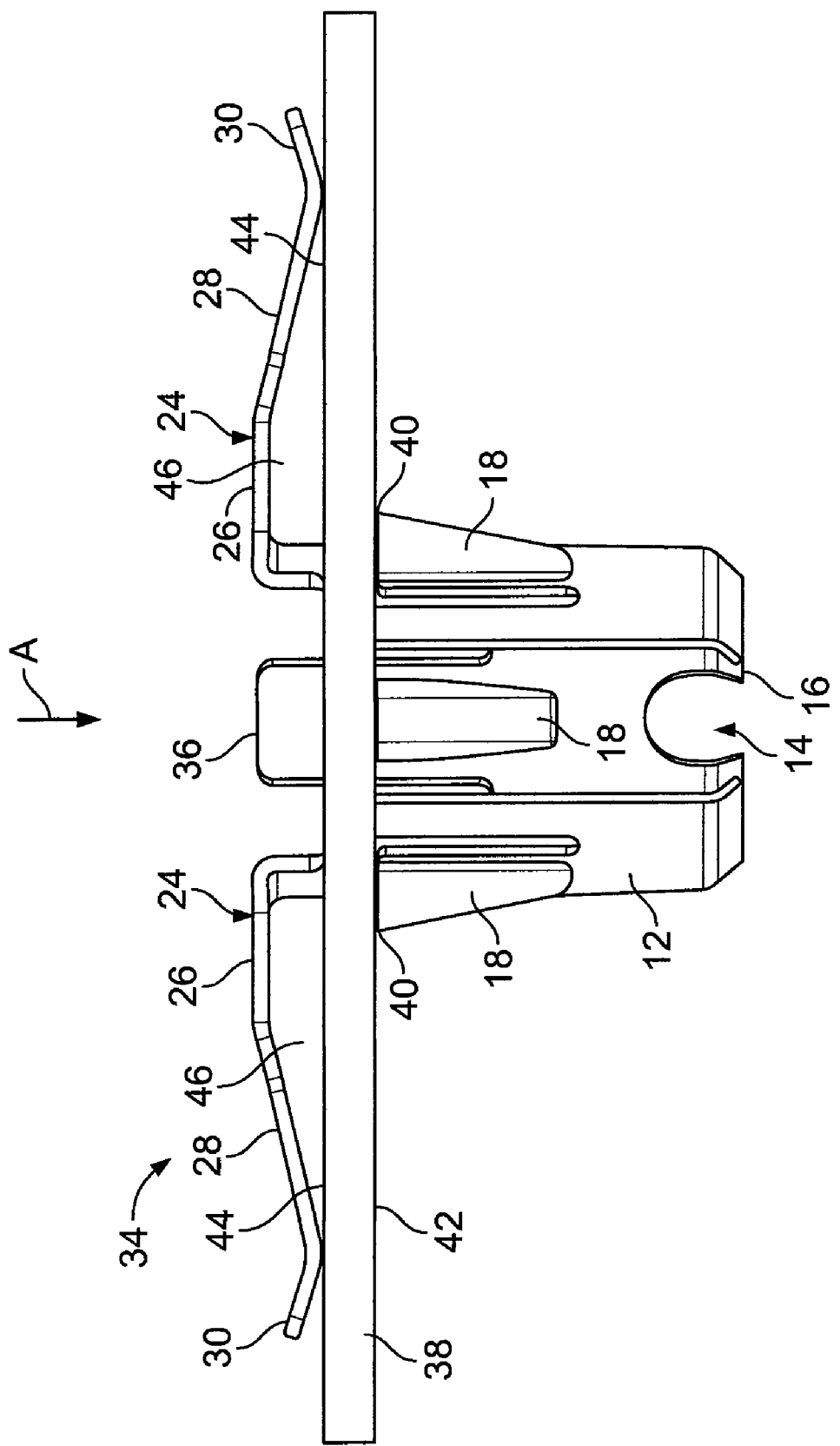
FIG. 3 illustrates a front view of a retention clip that is securely positioned with respect to a panel according to an embodiment of the present invention.

FIG. 3 illustrates a front view of the retention clip 34 that is securely positioned with respect to a panel 38 (such as a panel within a vehicle) according to an embodiment of the present invention. In order to securely position the retention clip 34 into the panel 38, the main body 12 is urged into a hole (hidden from view) of the panel 38 in the direction of arrow A. The leading ends 16 first pass into the hole. Because the leading ends 16 have a circumferential envelope that is smaller than the circumference of the hole, the leading ends 16 of the main body 12 easily pass into the hole without snagging edges of the panel 38.

As the main body 12 continues to pass into the hole, the louvered retaining tabs 18 pass over the edges of the panel 38 that define the hole. As shown in FIG. 3, the width of the louvered retaining tabs 18 is smallest proximate the lower portion of the main body 12. That is, the louvered retaining tabs 18 taper down toward the leading ends 16 of the main body 12. Thus, as the main body 12 continues to pass into the hole, the main body 12 inwardly flexes. Once top edges 40 of the louvered retaining tabs 18 pass through the hole, the main body 12 outwardly deflects, and the louvered retaining tabs 18 snapably engage the underside 42 of the panel 38. The audible snap indicates that the retention clip 34 is fully secured to the panel 38.

When the louvered retaining tabs 18 snapably engage the panel 38, the lateral springs 24 exert a compressive force into a top surface 44 of the panel 38. The panel 38 is compressively sandwiched between top edges 40 of the louvered retaining tabs 18 and the wings 28 of the lateral springs 24. Thus, embodiments of the present invention provide a retention clip 10 or 34 that may be secured to a panel 38 without the need for a separate tool or a fastener.

As shown in FIG. 3, the lateral springs 24 abut the top surface 44 of the panel 38 proximate the distal ends 30 of the wings 28. Open areas 46 are defined between the lateral springs 24 and the top surface 44 of the panel 38. Material, such as fabric, may be securely pinched between the panel 38 and the wings 28, while portions of the material may be trapped within open areas 46. Thus, the retaining clip 34 (or 10) securely pinches material to the panel 38.

In order to remove the retention clip 34 from the panel 38, a tool, e.g., pliers, may be used to inwardly squeeze the main body 12 such that the louvered retaining tabs 18 may pass through the hole. The main body 12 may then be removed from the panel 38. Additionally, because the extending beam 36 is positioned over the panel 38, a user may engage and inwardly urge the upstanding beam 36 toward the center of the retention clip 34. During this movement, the louvered retaining tab 18 secured to the extending beam 36 loses contact with the underside 42 of the panel 38, thereby allowing easier removal of the main body 12.

Figure 4:
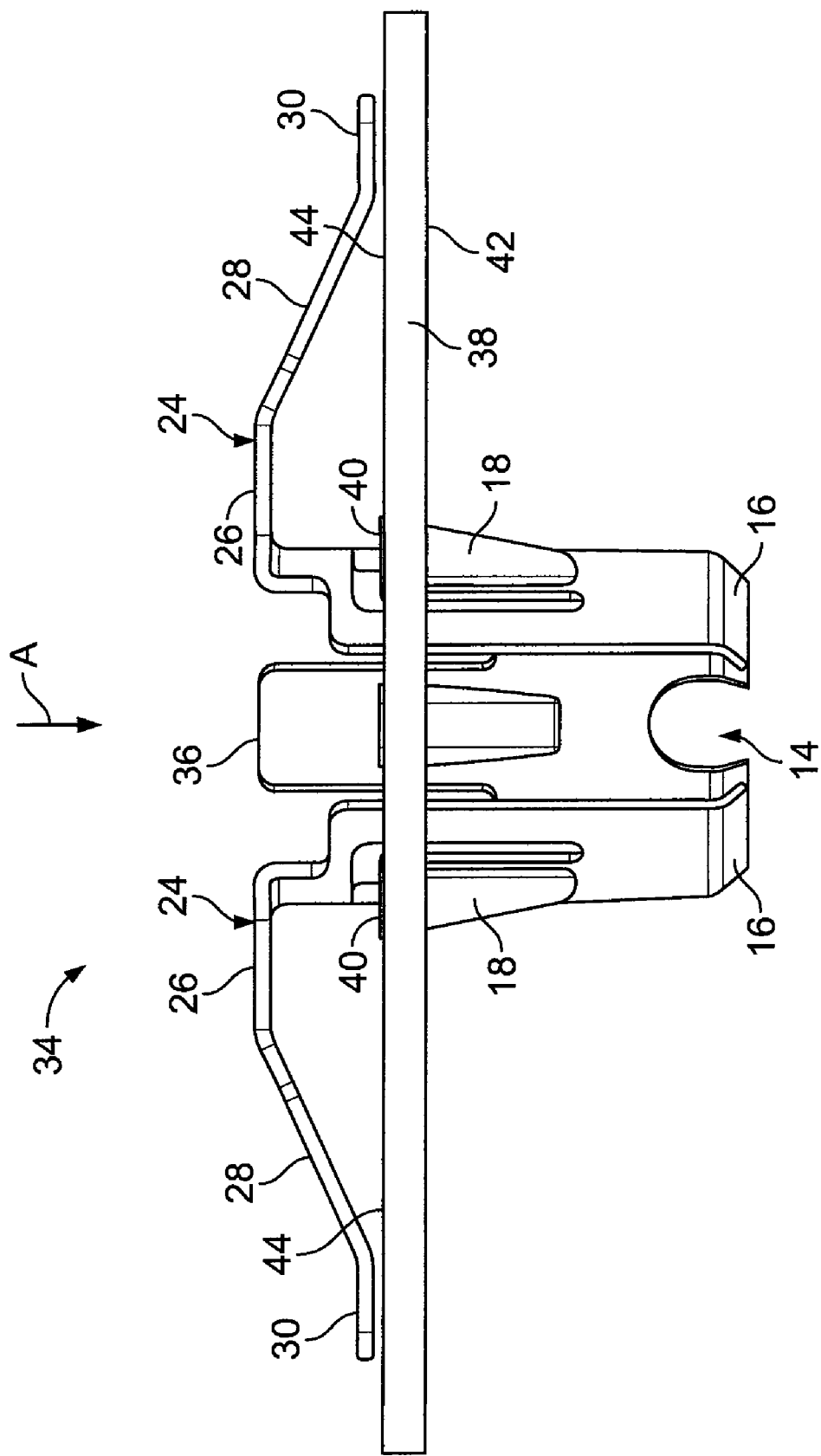
FIG. 4 illustrates a front view of a disengaged retention clip with respect to a panel according to an embodiment of the present invention.

FIG. 4 illustrates a front view of the retention clip 34 in a non-secured position with respect to the panel 38. In this position, the top edges 40 of the louvered retaining tabs 18 do not abut the underside 42 of the panel 38. As such, the retention tab 34 may be removed from the hole formed in the panel 38 as there is nothing that securely latches it to the panel 38.

Additionally, in the non-secured position, no portion of the lateral springs 24 abuts the top surface 44 of the panel 38. Thus, a gauge, such as a piece of material having a particular thickness, may be positioned between the lateral springs 24 and the panel 38 to determine if the retention clip 34 (or 10) is fully engaged. If the gauge passes between the springs 24 and the panel 38, then the retention clip 34 is not properly secured. Conversely, if the gauge is blocked from passing between the springs 24 and the panel 38, then the retention clip is properly secured.

Figure 5:
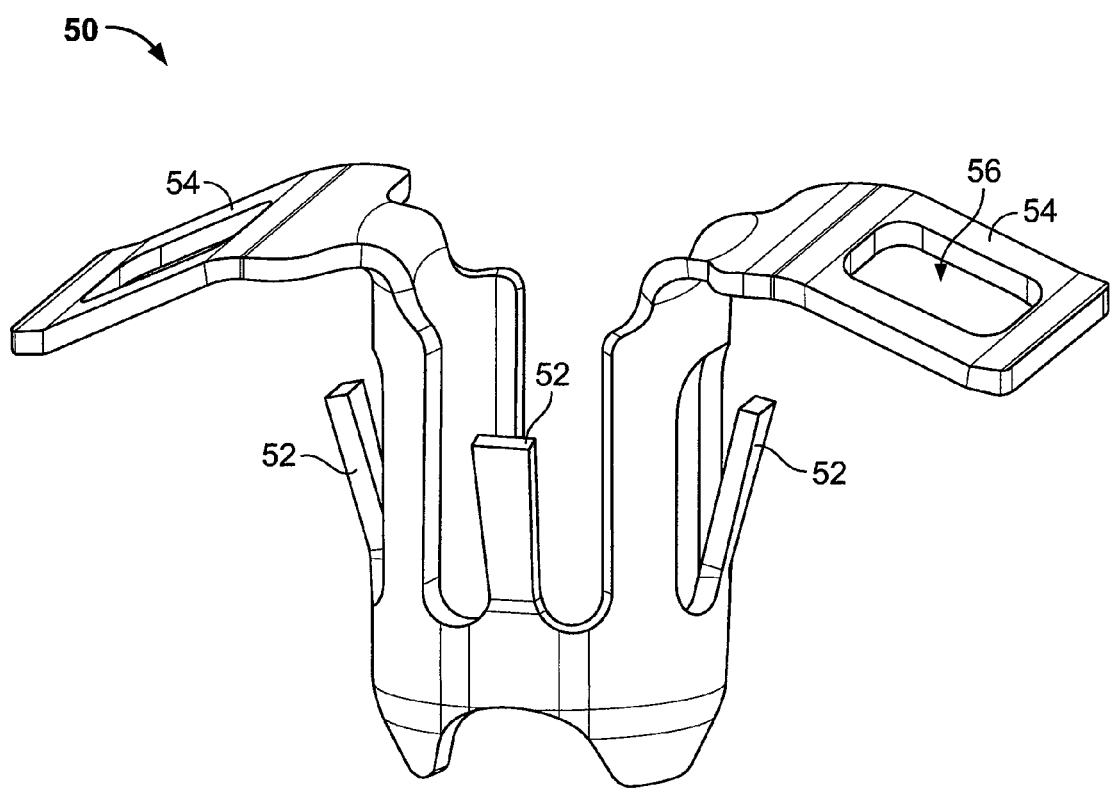
FIG. 5 illustrates an isometric view of a retention clip according to an embodiment of the present invention.

FIG. 5 illustrates an isometric view of a retention clip 50 according to an embodiment of the present invention. The retention clip 50 is similar to the retention clips 10 and 34, except, instead of louvered retaining tabs, the retention clip 50 includes a plurality of planar or flat tabs 52. The planar tabs 52 allow for a lower insertion force into a smaller hole of a panel. While the planar tabs 52 may not be as robust as the louvered retaining tabs, the planar tabs 52 allow the retention clip 50 to be inserted into a hole with less force. Further, the force used to squeeze the planar tabs 52 toward one another during a removal process is less than that used with respect to louvered retaining tabs. Additionally, the retention clip 50 includes wings 54 having larger openings 56 formed therethrough. The larger openings 56 provide increased flexibility and resiliency with respect to the wings 54.

Figure 6:
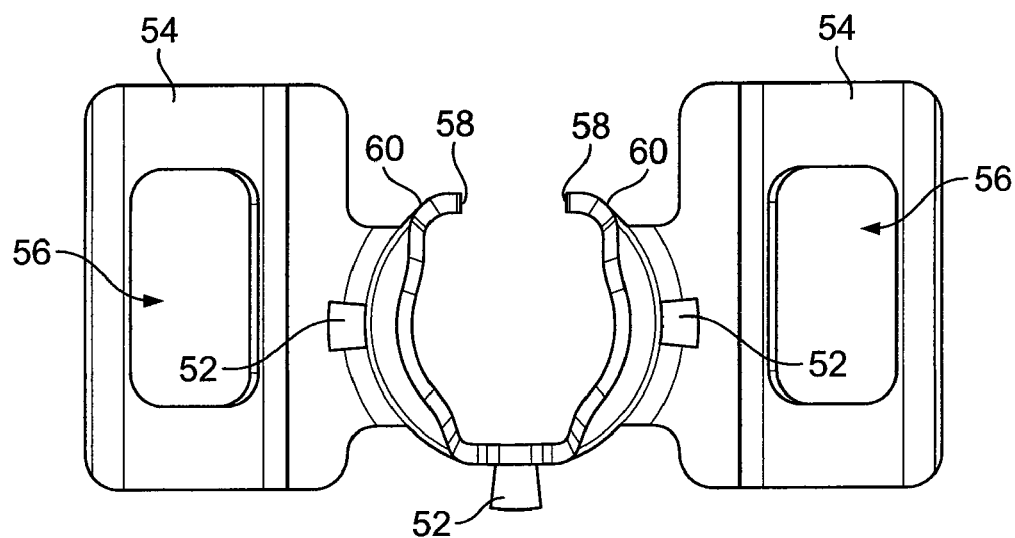
FIG. 6 illustrates a top plan view of a retention clip according to an embodiment of the present invention.

FIG. 6 illustrates a top plan view of the retention clip 50. As shown in FIG. 6, vertical edges 58 of main walls 60 of the retention clip 50 are inwardly bent in order to minimize snagging or dragging when the retention clip 50 is inserted into a hole of a panel. Exposed edges of the main bodies 12 of the retention clips 10 and 34 may be similarly bent.

Figure 7:
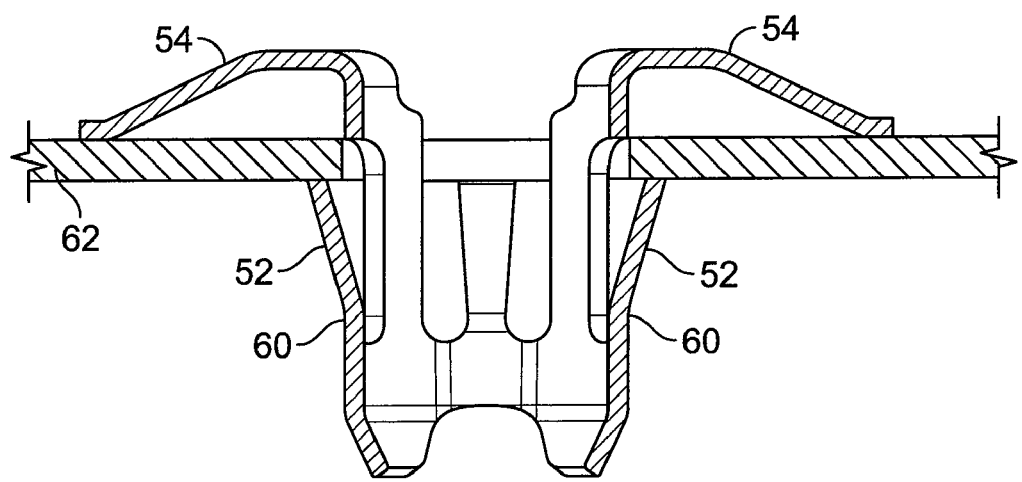
FIG. 7 illustrates a cross-sectional view of a retention clip securely positioned with respect to a panel according to an embodiment of the present invention.

FIG. 7 illustrates a cross-sectional view of the retention clip 50 securely positioned with respect to a panel 62. The retention clip 50 is positioned within a hole of the panel 62 similar to that described above. During insertion, the planar tabs 52 inwardly flex until their distal edges snapably engage the underside of the panel 62. Because the planar tabs 52 are flat, they are easier to inwardly deflect during a removal process than the more robust louvered retaining tabs discussed above.

Thus, embodiments of the present invention provide retention clips that are easily secured to a panel without the use of tools or fasteners. The cylindrical shape of the main bodies or walls of the retention clips provide easier insertion into a reciprocal hole. While louvered retaining tabs provide a robust secure engagement with the panel, planar tabs may be used when lower insertion forces are desired.

Embodiments of the present invention provide a tight, rattle-free securing interface. Embodiments of the present invention provide a retention clip that greatly simplifies side curtain airbag installation. A single worker may install the airbag, instead of a plurality of workers, due to the fact that no tools or separate fasteners (such as screws or bolts) are required to securely position the retention clip with respect to a panel to which the airbag is to be secured.

While various spatial terms, such as upper, bottom, lower, mid, lateral, horizontal, vertical, and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A retention clip comprising:
   a generally cylindrical main portion having a leading end configured to pass into a hole of a panel, wherein said main portion comprises walls separated by an opening, wherein said opening is configured to allow said main portion to inwardly flex;
   at least one retaining tab extending from said main portion, wherein said at least one retaining tab comprises a plurality of louvered retaining tabs, wherein each of said plurality of louvered retaining tabs tapers toward a leading end of said main portion; and
   at least one spring member extending from said main portion, wherein said at least one retaining tab and said at least one spring member are configured to compressively sandwich a portion of the panel therebetween.

2. The retention clip of claim 1, wherein said at least one retaining tab is configured to snapably secure to the portion of the panel.

3. The retention clip of claim 1, wherein each of said plurality of louvered retaining tabs is semi-cylindrical.

4. The retention clip of claim 1, further comprising at least one extending beam, wherein at least one of said plurality of louvered retaining tabs extends from a lower area of said at least one extending beam.

5. The retention clip of claim 1, wherein said at least one retaining tab comprises three planar tabs evenly spaced about said main portion.

6. The retention clip of claim 1, wherein said at least one spring member comprises two opposed spring members.

7. The retention clip of claim 1, wherein said at least one spring member comprises a beam extending from said main portion and a wing connected to said beam, wherein a portion of said wing is configured to abut the portion of the panel.

8. The retention clip of claim 7, wherein a hole is formed through a portion of said wing.

9. The retention clip of claim 1, wherein said leading end is radially canted toward a center of the main portion.

10. The retention clip of claim 1, wherein exposed edges of said main portion are rounded to avoid snagging the panel.

11. A retention clip comprising:
    a main portion having a leading end configured to pass into a hole of a panel;
    a plurality of retaining tabs extending from said main portion, each of said retaining tabs having a top surface, said plurality of retaining tabs being configured to snapably secure to a portion of the panel;
    a plurality of spring members extending from said main portion, wherein said plurality of retaining tabs and said plurality of spring members are configured to compressively sandwich the portion of the panel between said top surfaces of said plurality of retaining tabs and said plurality of spring members; and
    at least one extending beam extending from said main portion, said at least one extending beam having a top surface defining a free end, wherein at least one of said plurality of retaining tabs extends from a lower area of said at least one extending beam, such that said free end of said at least one extending beam is configured to extend above said top surfaces of said plurality of retaining tabs so as to be engageable above a surface of the panel when said retention clip is positioned into the hole of the panel.

12. The retention clip of claim 11, wherein said main portion comprises walls separated by an opening, wherein said opening is configured to allow said main portion to inwardly flex.

13. The retention clip of claim 11, wherein each of said plurality of retaining tabs comprises a semi-cylindrical tapered louver.

14. The retention clip of claim 11, wherein said plurality of retaining tabs comprise three planar tabs evenly spaced about said main portion.

15. A retention clip configured to secure fabric to a panel, the retention clip comprising:
- a generally cylindrical main portion having leading ends configured to pass into a hole of the panel, said leading ends surrounding an opening extending through an end of the main portion and being radially canted toward a center of the opening in the end of the main portion;
- retaining tabs extending from said main portion, said retaining tabs being configured to snapably secure to a portion of the panel, wherein each of said retaining tabs comprises a semi-cylindrical tapered louver; and
- two opposed spring members extending from said main portion, each of said a two opposed spring member comprising a beam extending from said main portion and a wing connected to said beam, a hole being formed through said wing, wherein a portion of said wing is configured to abut the portion of the panel, and wherein said retaining tabs and said two opposed spring members are configured to compressively sandwich a portion of the panel therebetween.

16. The retention clip of claim 15, wherein said retaining tabs comprises three planar tabs evenly spaced about said main portion.

* * * * *